United States Patent
Ray

(10) Patent No.: US 6,568,648 B1
(45) Date of Patent: May 27, 2003

(54) BOATSAVER "SUPER PRO ROD HOLDER BASE"

(76) Inventor: Jesse David Ray, 4249 Dabbs Bridge Rd., Acworth, GA (US) 30101

( * ) Notice: Subject to any disclaimer, the term of this patent is extended or adjusted under 35 U.S.C. 154(b) by 0 days.

(21) Appl. No.: 09/710,527

(22) Filed: Nov. 9, 2000

(51) Int. Cl.7 .............................................. A45B 25/28
(52) U.S. Cl. ..................................................... 248/538
(58) Field of Search ........................... 248/228.6, 228.5, 248/538, 520, 539, 511, 534; 43/21.2

(56) References Cited

U.S. PATENT DOCUMENTS

| | | | | |
|---|---|---|---|---|
| 5,519,959 A | * | 5/1996 | Cross .......................... | 43/21.2 |
| 5,560,576 A | * | 10/1996 | Cargill ................... | 248/231.61 |
| 5,564,670 A | * | 10/1996 | Dysarz ........................ | 248/515 |
| 5,662,306 A | * | 9/1997 | Dysarz .................... | 248/538 X |
| 6,256,844 B1 | * | 7/2001 | Wheatley ............... | 24/265 CD |
| 6,289,627 B1 | * | 9/2001 | Gibbs et al. ................. | 43/21.2 |

FOREIGN PATENT DOCUMENTS

NO 68275 * 9/1944 ................. 248/538

* cited by examiner

Primary Examiner—Ramon O. Ramirez

(57) ABSTRACT

A clamp-on fishing rod holder base that can be used with any rod holder with a ⅜ inch threaded rod. It will hold two (2) spinning, or casting rods and reels securely to any boat with tie-down cleats. The position of the tie-down cleats on most fishing boats are located either on the top, 90 degrees of horizontal surface, on a 45 degree angle, inside or outside, and on rare occasions the tie-down cleat is mounted on a vertical surface. The device comprises; T-bracket with two (2) ⅜ inch threaded holes. One in each end of the top bar, a channel bracket, which will be called a C-bracket from here on, and a ⅜ inch bolt assembly that is used to pull the C-bracket and the T-bracket together with the tie-down cleat between the two (2) brackets. When the bolt assembly is tightened, it acts as a clamp and holds the rod holder base on the boat. The C-bracket has a tab on the bottom, that protrudes under a tie-down, which provides a safety catch.

7 Claims, 6 Drawing Sheets

SHEET 1
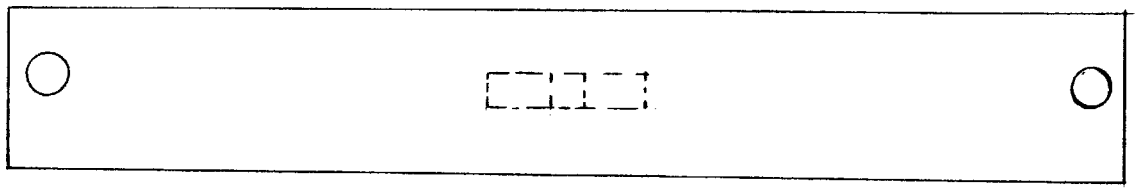
FIG. 1
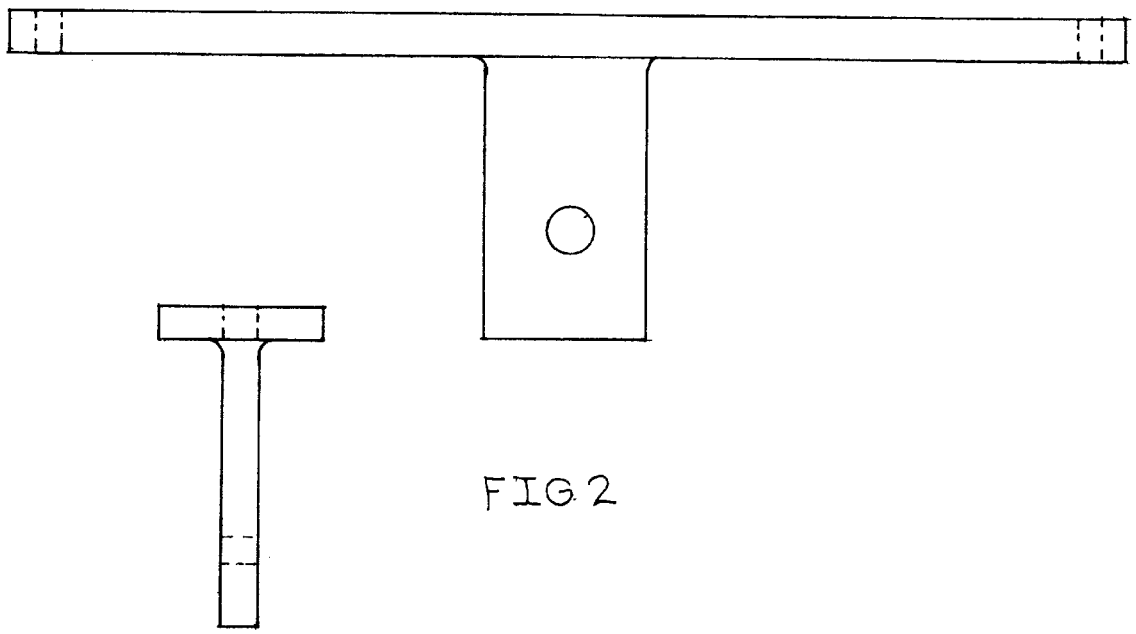
FIG. 2
FIG. 3

SHEET 2

BOATSAVER "SUPER PRO ROD HOLDER BASE"

FIELD OF THE INVENTION

This invention relates to the sport of angling, where anglers have the option to fish with live bait without having to hold their rods in their hands all the time. Many anglers have lost rod and reels because they placed them on the deck of their boat and a fish hit and pulled the rod in the water. In the past many companies have manufactured rod holders to be used on boats, all of which require attaching to the boat. Most all boats are not manufactured with rod holders built in. If an angler wanted a rod holder on his or her boat there was only one thing they could do. The only way to attach rod holders in the past was to drill holes in your boat. Some boat manufactures put round grab rails on their boats. To attach rod holders to these round rails an angler still had to drill holes in their boats. This device solved the problem of drilling holes in boats that cost upwards of $40,000 and no angler wants to put holes in new boats or even older boats that cost several thousand dollars. This invention was the answer for those who wanted rod holders, but didn't want the holes. The device simply attaches to an existing factory installed part, the tie-down cleat. When an angler doesn't need the rod holder base, simply remove one bolt assembly and store it until the next time. This rod holder base can be attached or removed in about two (2) minutes. The rod holder base will accommodate any manufactured rod holder with a ⅜ inch threaded shaft. With this device, it will be the end of the angler losing their equipment, due to fish pulling it out of the boat.

OBJECTS OF THE INVENTION

The broad object of this invention is to give anglers a choice of having a rod saving device mounted on their boats without having to drill holes in their boats.

Another object of this invention is to allow the installation or removal of device within just a couple of minutes.

A further object of this invention is to give angler a rod holder base that is very functional and easy to use, requiring no more than two common tools to install, without drilling any holes.

A further object of this invention is to allow anglers to have a rod holder base that is made of ⅜ inch by 2 inch aluminum that can be mounted in the bow or stern of any boat with tie-down cleats. Also, with a lifetime warranty. This invention will give anglers peace of mind, at a low-cost while enjoying the past time of fishing.

SUMMARY OF THE INVENTION

This rod holder base is a versatile device that is capable of being attached to most fishing boats having tie-down cleats in many locations. The rod holder base utilizes both mechanical stops and a clamping force and consist of;

a T-bracket, made of sturdy ⅜ inch aluminum, with two (2) threaded holes, one on each end of the top portion of the fourteen (14) T-bracket. These holes will accommodate any commercially manufactured rod holder device with a ⅜ inch threaded shaft.

The vertical portion of the T-bracket has a ⅜ inch hole in the lower portion to accept the bolt assembly that attaches the C-clamp to the T-bracket.

A C-bracket that is detachable and used to interface with either the inside or outside of the vertical rectangular bar of the T-bracket to form a clamping device that attaches the device to any tie-down cleat on a boat. The tie-down cleat on a boat acts as a fulcrum, when the bolt assembly passed through the C-bracket and through the T-bracket causing the top of the C-bracket to apply pressure as a clamping device. Also, the hex bolt pulls the T-bracket and the C-bracket together. The lower part of the C-bracket had a safety tab, which passed under the tie-down cleat and keeps the T-bracket securely fastened to the boat.

BRIEF DESCRIPTION OF THE DRAWINGS

This invention will be understood more by reference to the following description when read while viewing the attached drawings:

FIGS. 1, 2, and 3, show the mechanical views of the T-bracket. The top, front, and right side of the device.

DESCRIPTION OF DEVICE

Figure 4:
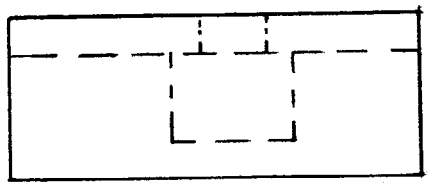
FIGS. 4, 5, and 6, show the top, front and right side of the C-bracket of the invention.
Figure 5:
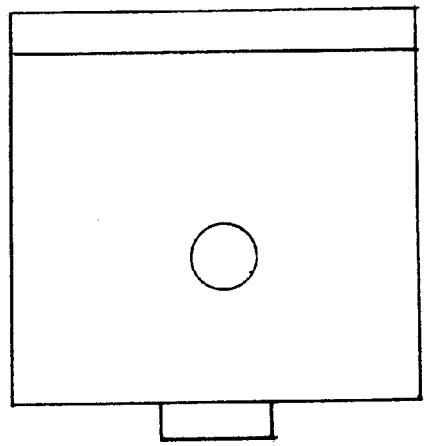
Figure 6:
Figure 7:
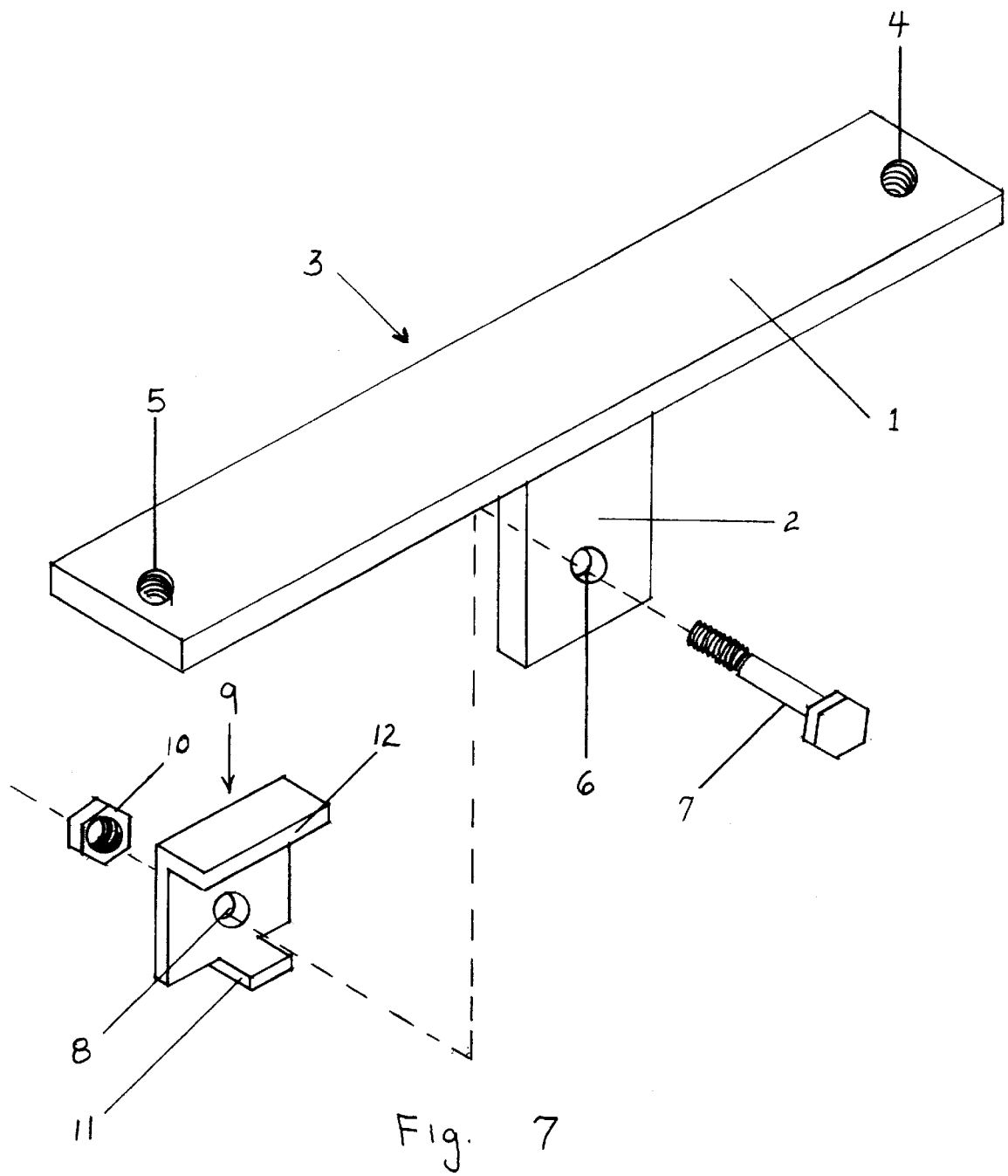
FIG. 7 shows an exploded perspective view of the device.
Figure 8:
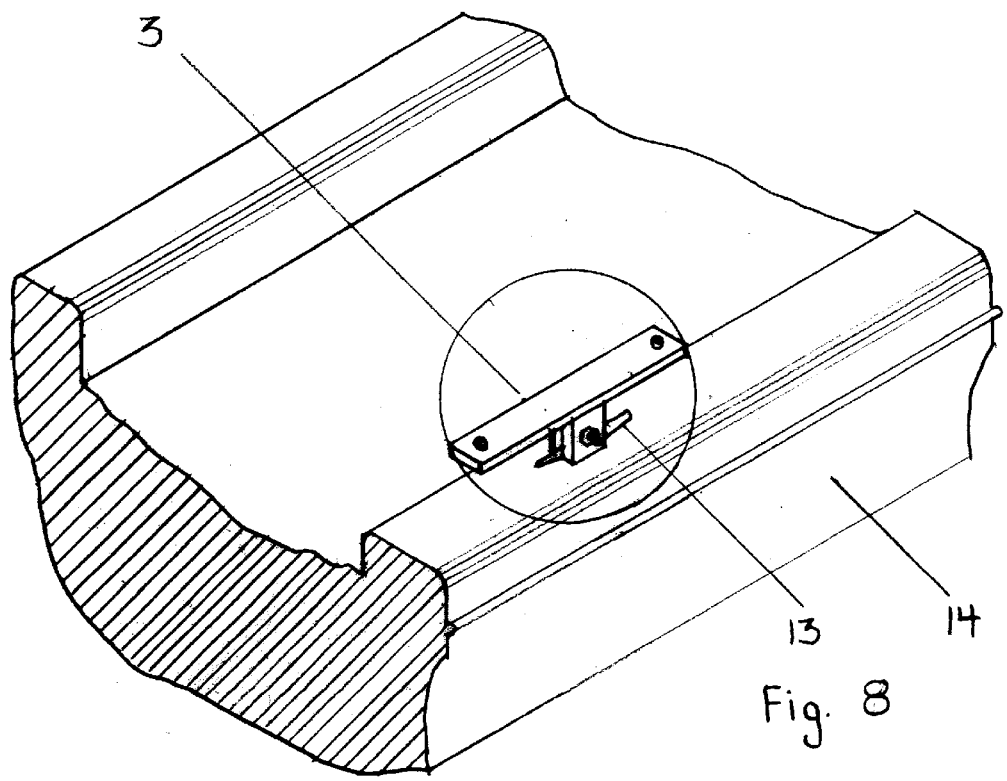
FIG. 8 shows a perspective view of a boat with the device attached.
Figure 9:
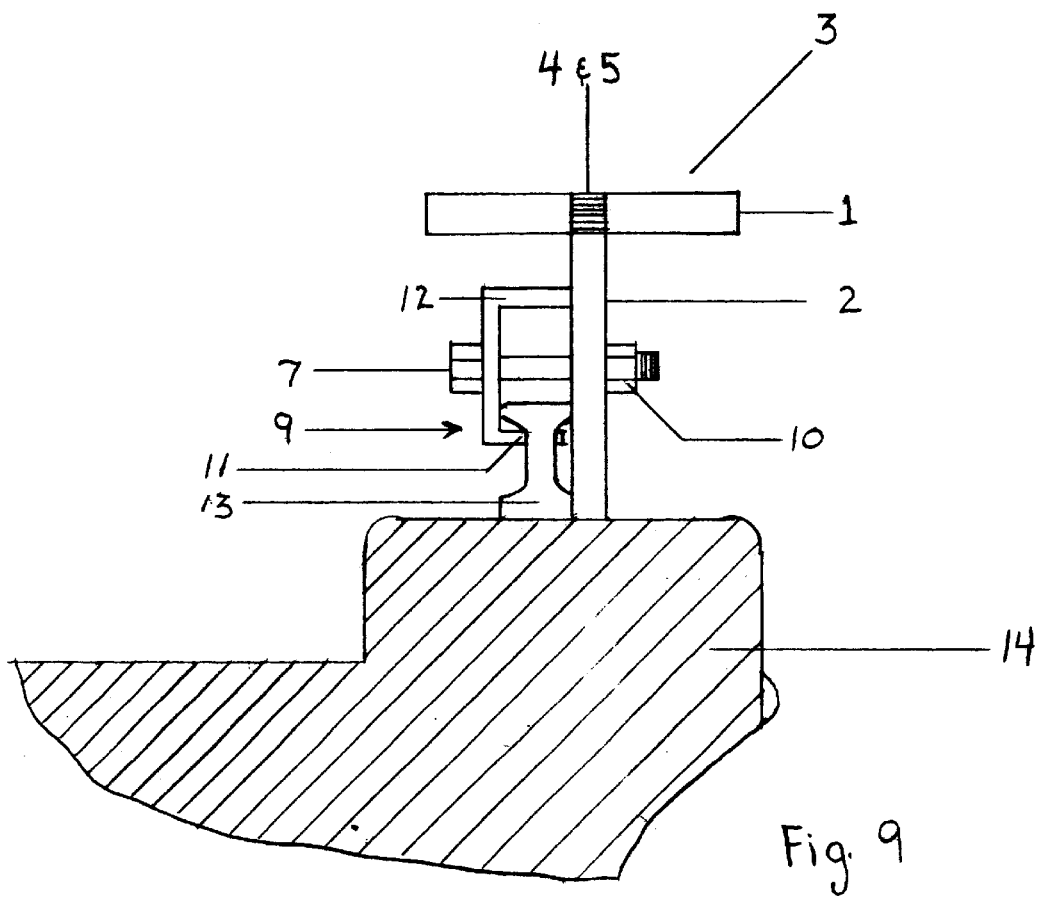
FIG. 9 shows a cross section of a boat with the invention secured to a boat.
Figure 10:
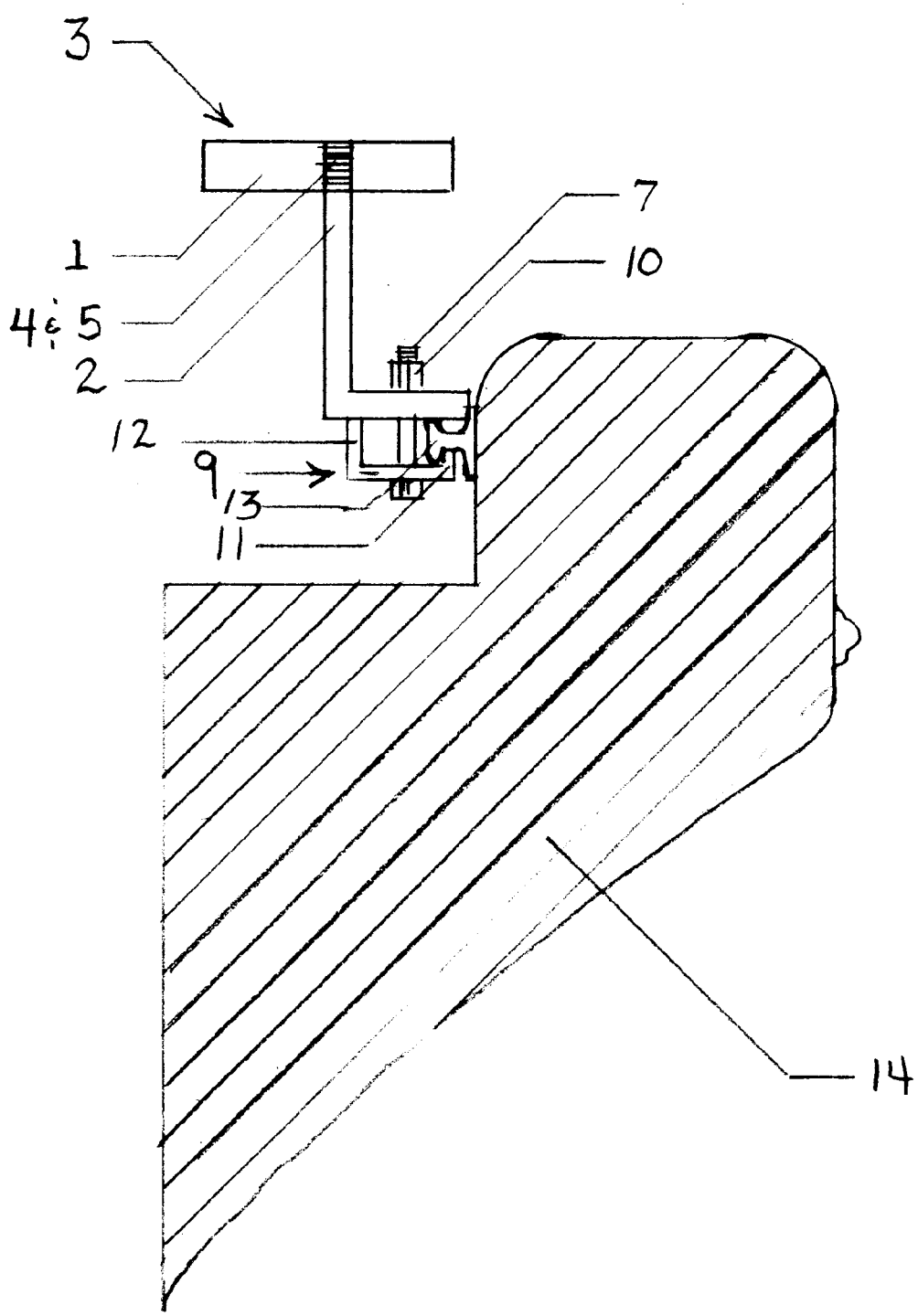
FIG. 10 is a cross section of a boat showing the various applications of the device.
Figure 11:
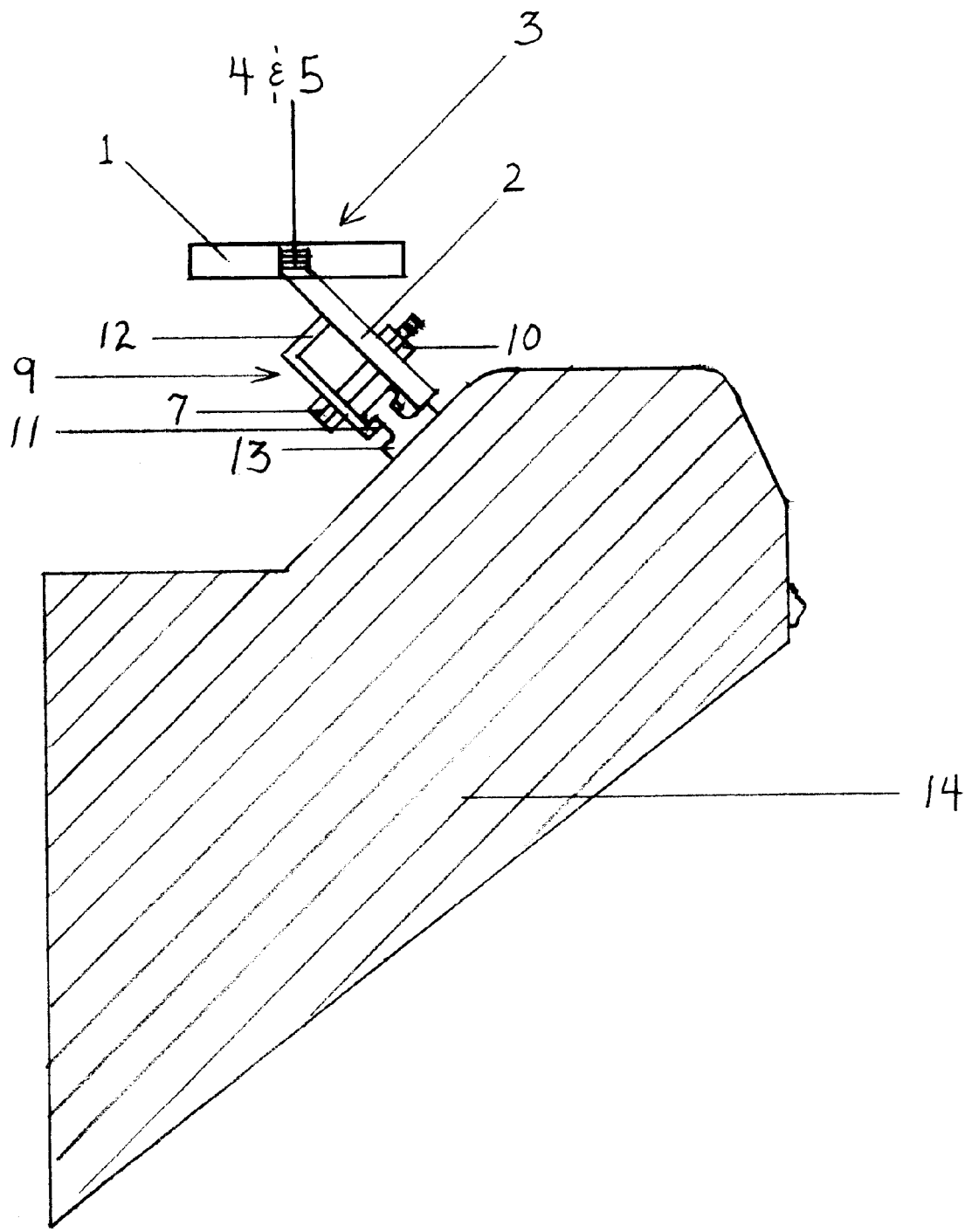
FIG. 11 is a cross section of a boat showing another application of the device.

Referring to the drawings, particularly FIG. 7, the invention is shown having a T-bracket which has a top rectangular bar 1 with two threaded holes 4 and 5. The T-bracket 3 is welded to a vertical rectangular bar 2 with a hole 6 for bolt 7 to pass through a C-bracket 9 containing a hole 8 through which aforementioned bolt 7 passed through to be locked in place with nut 10. The assembly 3 the T-bracket can be placed on the outside of the boat tie-down cleat. C-bracket 9 is placed on the inside of the boat tie-down cleat with the lower tab 1 under the center slot of the tie-down cleat, a hex bolt 7 is placed through hold 6 (above the boat tie-down cleat) in T-bracket after which bolt 7 passed through hole 8 in the C-bracket 9. A hex nut 10 is placed on the hex bolt 7 to lock the bolt. At this time the boat tie-down cleat acts as a fulcrum since the bolt 7 and nut 10 are above the tie-down cleat. As the bolt assembly is tightened it draws the C-bracket against the T-bracket applying pressure with top of C-bracket 9. Tab 11 on the bottom of the C-bracket keeps the device from moving upwards on the boat tie-down cleat. FIG. 8 shows a perspective of a boat cross section 14 with assembly 3 attached to the boat by utilizing the tie-down cleat 13. FIG. 9 shows a cross section of boat 14 with detailed drawing of T-bracket assembly 3. T-bracket 3 is placed on outside of tie-down cleat 13 with the C-bracket clamp 9 on the inside of the tie-down cleat 13 with safety tab 11 under tie-down cleat 13. Hex bolt 7 passed through hole 6 in T-bracket 3 and through hole 8 in C-bracket 9, hex nut 10 placed on bolt 7 and tightened. When hex nut 10 is tightened it pulls T-bracket 3 and C-bracket 9 together creating pressure on top bar 12 of C-bracket 9. This securely attaches the invention to a boat. FIG. 10 shows another cross section of a boat 14 with a slightly different application of invention. The process of the aforementioned explanation of FIGS. 8 and 9 applies to this drawing also. FIG. 11 is another cross section of a boat 14 showing the application of the T-bracket 3 and C-bracket 9 in a slightly different position.

All sequences of application are the same as in aforementioned FIGS. 8 and 9. Any commercial produced rod holders with a ⅜ inch threaded shaft can be used with this invention.

Although the invention has been described referred to a preferred embodiment, it will be understood that the details herein are to be interpreted as illustrative and are not in a limiting sense.

What is claimed is:

1. A device for holding rods on a boat having tie-down cleats mounted on the bow or stern, said device comprising:
   a) a T-shaped bracket defined by a horizontal bar having at least one threaded aperture to secure a rod holder, and a vertical bar secured perpendicularly to said horizontal bar;
   b) a C-shaped bracket adapted to be secured to one tie-down cleat of said boat and defined by an upper section, a middle portion extending downwardly and perpendicularly from said upper section, and a lower portion extending perpendicularly from said middle portion and parallel to said upper portion; and
   c) means for securing the two brackets together and the C-shaped bracket to the tie-down cleat.

2. The device recited in claim 1, wherein the said means for securing comprises an opening on the T-shaped bracket vertical portion and on the C-shaped bracket middle portion, a bolt extending through both openings and a locking means for locking the bolt.

3. The device recited in claim 2, wherein said locking means is a nut.

4. The device recited in claim 2, wherein the bolt is a hex bolt.

5. The device recited in claim 1, wherein said at least threaded aperture comprises two threaded apertures.

6. The device recited in claim 1, wherein said T-shaped bracket bars are secured by welding.

7. The device recited in claim 1, wherein the brackets are made of aluminum.

* * * * *